United States Patent [19]

Sukup

[11] Patent Number: 5,214,876
[45] Date of Patent: Jun. 1, 1993

[54] IMPLEMENT FOR THE REMOVAL OF INSECTS OR THE LIKE FROM UPSTANDING PLANTS

[75] Inventor: Eugene G. Sukup, Hampton, Iowa
[73] Assignee: Sukup Manufacturing Company, Sheffield, Iowa
[21] Appl. No.: 550,751
[22] Filed: Jul. 10, 1990

Related U.S. Application Data

[63] Continuation-in-part of Ser. No. 513,960, Apr. 25, 1990.

[51] Int. Cl.$^5$ ............................................. A01M 5/00
[52] U.S. Cl. ........................................................ 43/140
[58] Field of Search ................... 43/138, 139, 140, 141

[56] References Cited

U.S. PATENT DOCUMENTS

| | | | |
|---|---|---|---|
| 1,012,437 | 12/1911 | Rea | 43/141 |
| 1,189,720 | 7/1916 | Morrow . | |
| 1,250,516 | 12/1917 | Salter | 43/141 |
| 1,457,420 | 6/1923 | Bender . | |
| 1,586,123 | 5/1926 | Sikorski . | |
| 2,111,030 | 3/1938 | Mote . | |
| 2,201,463 | 5/1940 | Williams et al. . | |
| 2,346,270 | 4/1944 | Nisbet | 43/141 |
| 2,374,150 | 4/1945 | Williams | 43/140 |
| 2,389,677 | 11/1945 | McCay . | |
| 2,608,023 | 8/1952 | Dillon . | |
| 2,643,482 | 6/1953 | Wilson | 43/140 |
| 2,722,082 | 11/1955 | Nisbet . | |
| 4,683,673 | 8/1987 | Taylor | 43/139 |
| 4,825,582 | 5/1989 | Szynal . | |

OTHER PUBLICATIONS

Magazine Photograph of the "Vac Us" system manufactured by Daco. California Farmer, Sep. 1, 1990.
Newspaper photograph of machine developed by Driscoll Strawberry Associates, Inc., *The Washington Times*, Aug. 24, 1988, p. E8.
Paper entitled "A Pneumatic System For the Removal of Insects From Leafy Greens," by Travis B. Unterzuber, drawing dated May 11, 1972.

*Primary Examiner*—Richard K. Seidel
*Assistant Examiner*—James Miner
*Attorney, Agent, or Firm*—Leydig, Voit & Mayer Ltd.

[57] ABSTRACT

Implements for the removal of insects or the like are provided which dedicate an individual centrifugal fan unit to each plant row. The fan unit includes exhaust means which are constructed to traverse the top of the plant row in order to direct the exhaust airflow to the side of the plant opposite the fan intake. The exhaust airflow contacts and passes through the plant in order to facilitate insect removal. A portion of the exhaust airflow reenters the intake airflow thereby forming a closed circuit airflow. This closed-circuit airflow also permits the introduction of fluids such as pesticides or herbicides into the airflow while minimizing both fluid usage and fluid introduction into the general surrounding environment.

37 Claims, 1 Drawing Sheet

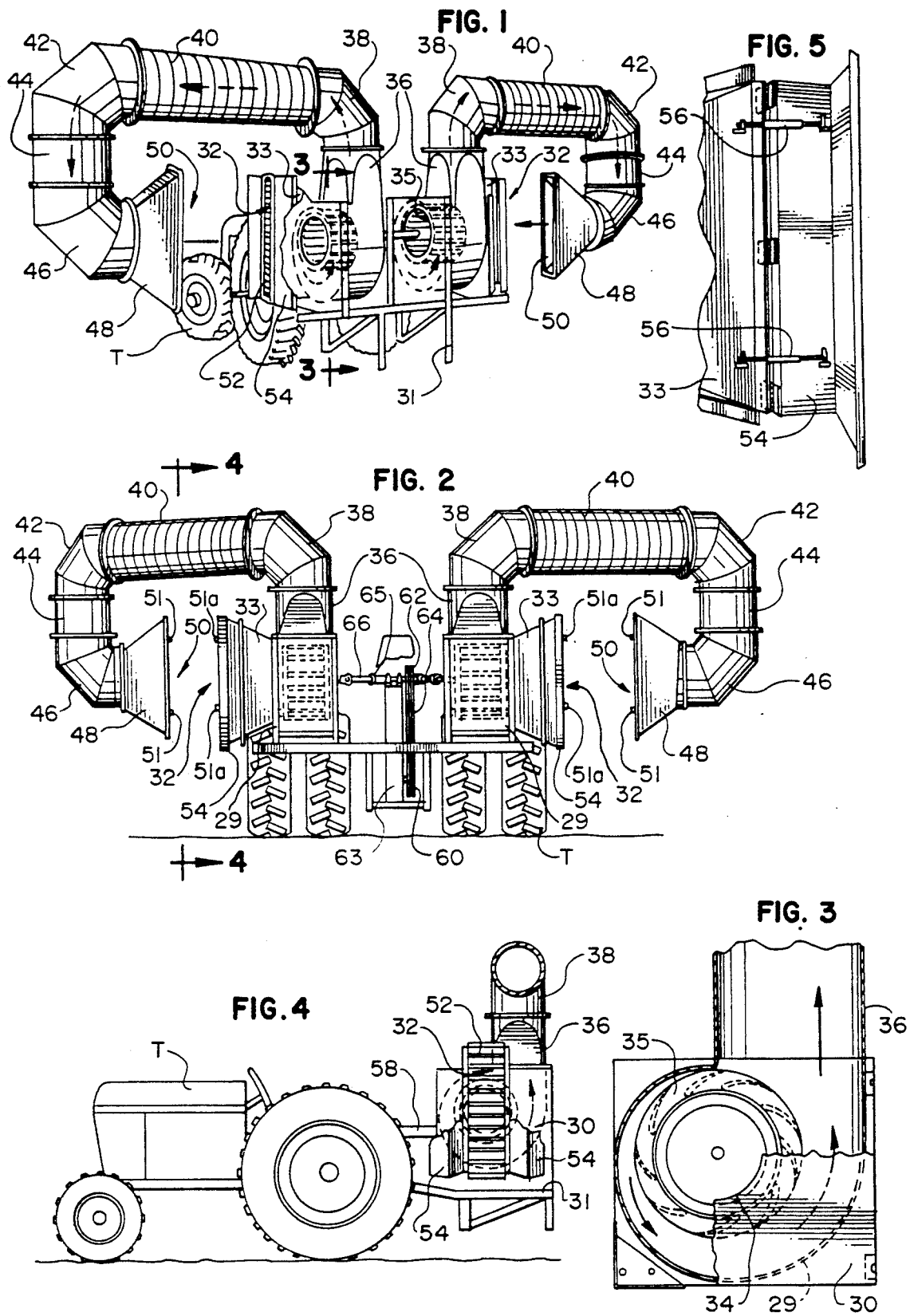

IMPLEMENT FOR THE REMOVAL OF INSECTS OR THE LIKE FROM UPSTANDING PLANTS

This is a continuation-in-part of copending application Ser. No. 07/513,960 filed Apr. 25, 1990.

BACKGROUND OF THE INVENTION

The present invention relates to implements for the removal of insects or the like (i.e., insects and other small pests against which pesticides are used on plant foliage) from upstanding plants, and particularly tall plants such as grape vines on trellises, or growing fruit trees, through the use of suction and forced air streams.

Presently, there is a heightened interest in insect control methods that are not wholly dependent on chemical pesticides. Such interest is in part caused by public concerns regarding the environmental dangers and risks presented by chemical pesticides. In addition, chemical pesticides are increasingly being rendered ineffective due to the evolution of pesticide-resistant strains of insects. Finally, pesticides are a substantial and recurrent burden on the farmer both in terms of pesticide cost and regulatory compliance.

It will be appreciated that the term "insect" is used herein to refer to any removable pests, including for example, larvae stages and worms as well as metamorphosed insects.

Various attempts at manufacturing effective and commercially practicable implements for insect removal have been undertaken in the past. However, these early implements are comparatively inefficient due to an inability to remove insects or the like from a plurality of upstanding crop rows simultaneously. In addition, the prior devices could not expose upstanding plants to a combined suction-blower action in an effort to maximize pest removal. Finally, the prior devices were not adapted to permit pesticide applications during the insect removal process in such a manner that the pesticide is kept within the recirculating air flow of the implement. Such an adaptation results in a minimization of pesticide usage, which benefits both the environment and the farmer.

The invention herein disclosed represents significant improvement over the prior art. The invention contains a dedicated fan unit for each plant row disposed closely adjacent to the plant row. Such proximity promotes removal efficiency. This invention has the added feature of destroying the insects so removed. In the preferred embodiment these fan units utilize centrifugal fans. Such fans are reliable and uncomplicated and also facilitate insect destruction. An air intake mouth is positioned to be adjacent one side of the plants and is in direct communication with the inlet of the respective fan. An exhaust duct means is positioned with its inlet substantially peripheral and tangential to the fan in order to collect the exhaust of the fan and channel it back towards the plant row. This exhaust air is directed to the plant row in a direction toward the intake mouth from the side opposite the fan intake. Such an arrangement results in the exhaust air passing through the plant row back towards the fan intake. This side-to-side blower-suction action facilitates insect dislodgment, removal, and destruction. This invention also has the capability to remove insects or the like from a plurality of upstanding plant rows simultaneously.

Implements for the removal of insects or the like from plants have been disclosed which utilize fans disposed closely adjacent to the plant row. Additionally, implements which permit the exhaust of the fan to be directed back towards the plant row in order to facilitate insect dislodgement and removal have been disclosed. Implements incorporating these features are described in a copending application Ser. No. 07/513,960 filed Apr. 25, 1990 which is incorporated herein by reference.

SUMMARY OF THE INVENTION

It is therefore an object of the present invention to provide an improved implement for removing and destroying insects or the like from upstanding plants, including relatively tall plants such as trellised grape vines and small trees.

Another object is to provide an implement which is adapted for use with conventional farm equipment such as tractors. This implement may receive its power from the tractor engine via belt drives, drive shafts, hydraulic motors, or the like. It is further contemplated that the implement could be powered by an independent power source such as a dedicated internal combustion engine.

Another object is to provide an implement which is capable of removing insects or the like from a plurality of plant rows simultaneously.

Another object is to provide a blower-suction type of implement with a simple fan arrangement which efficiently dislodges and removes insects from the foliage of upstanding plants and destroys those insects.

A further object it so provide an implement with a dispensing means which permits introduction of a pesticide, herbicide, or other fluid into the recirculating airstream; thereby decreasing both the amount of pesticide, herbicide, or other fluid required for effective plant treatment and the amount of pesticide, herbicide, or other fluid released into the general surrounding environment.

In summary, there is described an implement which dedicates at least one centrifugal fan per plant row, each such fan unit having a direct axial intake immediately adjacent to one side of the plant row. An exhaust means is also provided to direct the exhaust back to the plant row. The discharge means of the exhaust means is disposed immediately adjacent to the other side of the plant row in such a manner that the outlet of the discharge means is disposed directly opposite and pointed towards the fan intake. This arrangement permits the exhaust of the fan to pass through the plant row in order to complement the air flow induced by the vacuum effect of the intake and facilitate the dislodgement of insects. This exhaust stream or flow, in the form of a continuous air blast, then enters the suction area created by the fan intake; thus, a side-to-side combined blower-suction action is formed.

BRIEF DESCRIPTION OF THE DRAWINGS

FIG. 1 is a perspective drawing of an implement for the removal of insets or the like from upstanding plants and which employs teachings of this invention.

FIG. 2 is a rear elevational view of this implement of FIG. 1.

FIG. 3 is an enlarged, partially cutaway view of the fan housing of the implement taken along line 3—3 of FIG. 1.

FIG. 4 is a simplified side elevational view taken along line 4—4 of FIG. 2.

FIG. 5 is a perspective view of the intake throat and plant guides of this implement.

DETAILED DESCRIPTION OF THE DRAWINGS

Turning now to FIGS. 1, 2 and 3 therein is depicted one embodiment of an implement for removing insects from upstanding plants. The implement comprises a pair of centrifugal fan units—one fan unit is dedicated per plant row; therefore, the implement is capable of removing insects or the like from a plurality of such plant rows simultaneously. The fan units are disposed closely adjacent to the respective rows. This proximity maximizes the efficiency of insect removal. The two fan units of the implement are essentially mirror images of one another.

The centrifugal fan units of the implement may be of conventional construction. Each includes a fan housing 29, which is attached to a mounting plate 30, which is mounted on the frame 31. The frame 31 is adapted so as to permit attachment to a conventional farm tractor (T), e.g., through a known three-point hitch system.

Air is taken into the housing at high velocity through an inlet opening or "mouth" 32 and then through an intake throat 33. After passing through the inlet opening 32 and throat 33, the air enters and passes through a velocity enhancing venturi 34 (FIG. 3). The air then enters a centrifugal fan 35 axially and is thereafter discharged peripherally. Centrifugal fan 35 is responsible for this air movement.

By way of example, in one embodiment the fan housing has a dimension of 42" by 50" with an inlet opening of 7" by 48". The centrifugal fan has a diameter of 27 3/8". The venturi throat is 17" in diameter and the fan has a rating of 15,000 cfm at 1,800 to 2,000 rpm, which can be readily attained with the power available from conventional tractors. External air velocities in the range of 100 fps may be attained adjacent the inlet 32.

Although a centrifugal fan is illustrated, this invention is not limited to centrifugal fans. Any fan means capable of creating an adequate airflow is within the scope contemplated for this invention.

The air exits the centrifugal fan peripherally and is directed by the fan housing upward through a transition section 36, which serves to gather the air flow for efficient communication with connected conduit means. The transition section is substantially peripheral and tangential to the centrifugal fan. (FIG. 3). After passing through this section 36, the air enters and passes through interior exhaust elbow 38, which redirects the airflow approximately ninety degrees from a vertical direction to a horizontal direction. The airflow then enters and travels through horizontal exhaust conduit 40, which directs the airflow over the top of the plant so that the airflow can emanate at the opposite side of the plant in relation to the intake.

At the opposite side of the plant area, top exterior exhaust elbow 42 redirects the airflow approximately ninety degrees from a horizontal direction to a downward vertical direction. The air flow then travels through vertical exhaust conduit 44 and thence through bottom exterior exhaust elbow 46, which redirects the airflow approximately ninety degrees from a vertical direction to a horizontal direction. The airflow is directed back towards the intervening plant position, from the side opposite the intake of the implement. Finally, the airflow travels through exhaust throat 48, which has an outlet 50. Outlet 50 is axially aligned with the inlet 32. This exhaust airflow contacts and passes through the plant and thereby assists in the dislodgment and removal of insects and other pests from the foliage.

A major portion of this exhaust airflow is retaken into the inlet 32 of the intake throat 33 due to the direction of the exhaust and to the suction force created by the centrifugal fan 35. The complementary positioning of the exhaust throat to the inlet throat permits a blower-vacuum action which operates in a substantially closed-loop, side-to-side manner. Thus, insects are dislodged and removed by the air flow in the form of an airblast emanating from one side of the plant which is enhanced and directed into the fan inlet, along with entrained insects and the like by the vacuum or suction action imparted at the opposite side of the plant row by the centrifugal fan.

The airflow resulting from the combined blower-vacuum action also causes considerable disturbance, agitation and fluttering motion of the plant foliage, which is believed to assist in dislodging the insects therefrom and thereby contributes to their collection from the plant environment into the implement.

Any insects present in the intake airflow are destroyed when they pass through the implement. At present, it is believed that insect destruction is primarily a result of forceful impingement of the insects upon the fan components and most predominantly by forceful contact with the interior section of the fan housing 29 and the exhaust elbows 38, 42 and 46.

In the preferred embodiment, the side-to-side blow-vacuum action results from a substantially closed-loop or closed-circuit airflow. More specifically, a portion of the air which is taken into the implement and exhausted is redirected back through the intake. This airflow pattern is conducive to further advantageous additions such as fluid dispensing means. This can be accomplished via the inclusion of fluid spray nozzles or injectors in the path of the airflow. For example, a pair of spray nozzles 51 or injectors can be mounted on each exhaust throat 48 and directed towards the exhaust airflow in order to add the desired fluid into the recirculating airflow. The spray nozzles or injectors would be fed by a conventional fluid tank and pump means. The airflow would then also serve to apply this fluid to the foliage while simultaneously removing any excess and capturing any "spray-by" or "blow-by" of the pesticide. This excess would be substantially retained in the system and thus would be redeposited on other plants as the tractor with the implement moves down a plant row. Such action results in a more efficient pesticide application, which decreases both pesticide usage and pesticide introduction into the general surrounding environment. It should be noted that the spray nozzles or injectors can be disposed anywhere on the implement where the spray can come into direct contact with the recirculating airflow, such as on the intake (See 51a of FIG. 2).

Although this embodiment includes horizontal exhaust pipes, vertical exhaust pipes, and exhaust elbows, the invention is not limited to this arrangement. It is also possible to use a curved or arcuate duct to transfer the exhaust airflow over the top of the plant from the intake side of the plant to the side of the plant opposite the intake.

Turning to FIGS. 4 and 5, therein is depicted the details of the intake 33 and surrounding structures. A screen 52 is disposed at the opening of inlet 32. Screen 52 serves to prevent or limit plant foliage from entering the intake throat 33 and fan housing 29. In addition, it is believed that any insects which forcefully contact screen 52 are thereby destroyed.

Each intake throat 33 also has a plant guide 54 pivotally attached to its forward vertical side. These plant guides 54 serve to guide and gather the plant foliage for maximum exposure to the suction of the centrifugal fan. These plant guides 54 are hinged so that they can be adapted for a particular application. Positioning is maintained by a pair of screw adjusters 56 or the like for each plant guide 54. Similarly, foliage guides may be added on the exhaust outlets 50, if desired, though the direction of the airflow itself tends to push the foliage away from the outlets.

FIGS. 2 and 4 best illustrate an attachment and drive means for this embodiment. The implement is appropriately supported on a farm tractor (T) by attachment to a conventional rear-mounted three-point hydraulic hitch system 58 (FIG. 4). The implement is powered via the power takeoff of the tractor (T). This power is transferred to a bottom drive pulley 60, or by a gearbox 63, which in turn imparts rotational motion to top pulley 62 via a drive belt or belts 64. The axis of the top pulley 62 includes drive shaft 65, which further includes a plurality of universal joints 66. These universal joints serve to accommodate relative alignment variations and dampen any vibration. Drive shaft 64 imparts rotational motion of each centrifugal fan 35, which is responsible for the creation of the airflows. Rotational motion can also be imparted on the drive shaft via chain drives, drive shafts with gear boxes, hydraulic motors, or the like. It is also possible to power the implement via an independent power source such as a dedicated internal combustion engine.

It will be appreciated that the implement for the removal of insects or the like from the removal of insects or the like from upstanding plants which meets the aforestated objects has been herein disclosed. Fan units are dedicated to each plant row and maximize insect removal and destruction. The direct inlet centrifugal fans are uncomplicated, reliable, and efficient in removing insects or the like. The exhaust means channels the exhaust airflow of each fan to the side of the plant opposite the intake to facilitate dislodgement of insects. A portion of this exhaust is directed through the intake in the nature of a circuit or closed-loop. This arrangement results in a side-to-side, blower-vacuum action, which utilizes a high-velocity airflow to dislodge, remove, and ultimately destroy insects. In addition, this implement has a further advantage in that fluid spray nozzles or injectors can be used in conjunction with the implement. The airflow of the implement serves to keep excess fluid within the recirculating airflow; thus, minimizing both fluid usage and fluid introduction in to the general surrounding environment. Such fluids to be added and recirculated include, without limitation, pesticides, herbicides, fungicides and other crop treatment fluids.

The foregoing has concentrated on the preferred embodiment of the claimed invention. However, it is to be understood that changes or alterations in the construction, combination, and arrangement of parts may be resorted to without departing from the spirit and scope of the invention as claimed. For example, fans also may communicate with one another in a series relationship wherein the exhaust from one fan is directed through a crop row position to the inlet of another fan.

What is claimed is:

1. An implement for the removal of insects from plants arrayed in rows, comprising:

a fan housing and a fan in said housing which propels air through said housing at a substantial velocity, said housing with said fan therein being disposed on said implement in a position to be adjacent to one side of the plants in a row thereof traversed by said implement, said fan housing having an intake means between said fan and the adjacent plants being traversed by said implement and opening to said one side of the adjacent plants; and an exhaust air flow means connected to said fan housing, wherein said air flow means is a conduit which permits transfer of air from said one side of said plant row to a side of the adjacent plants opposite said one side, said air flow means including an exhaust outlet means closely adjacent said opposite side and directed toward said opposite side of said adjacent plants in a direction toward said intake means for directing exhaust air flow through the area adjacent said plants toward said intake means.

2. The implement of claim 1 wherein said intake means has an inlet opening and an inlet throat, said inlet opening disposed to be immediately adjacent to such plants in order to take in an intake airflow thereover, said exhaust airflow means comprising a conduit connected to said fan housing and traversing the plants and connected to said exhaust outlet means.

3. The implement of claim 1 wherein said intake means is axially aligned with the axis of rotation of said fan.

4. The implement of claim 3 wherein said fan is a centrifugal fan, and said centrifugal fan intakes axially and exhausts peripherally.

5. The implement of claim 4 wherein said implement comprises at least two such fan housings, at least two such exhaust means, and at least two such, discharge means whereby at least one fan housing, at least one exhaust means, and at least one discharge means are dedicated per plant row thereby permitting said implement to remove insects or the like from a plurality of plant rows simultaneously.

6. The implement of claim 2, 3, 4, or 5 wherein said exhaust means includes first, second, and third portions, said first portion extending substantially upward and attached to said fan housing, said second portion attached to said first portion and extending substantially horizontally from said first portion, said third portion attached to said second portion and extending substantially downward therefrom.

7. The implement of claim 6 wherein said first portion includes a transition piece and an interior exhaust elbow, said transition piece disposed substantially peripheral and tangential to said fan.

8. The implement of claim 6 wherein said second portion includes a horizontal exhaust conduit and a top exhaust elbow.

9. The implement of claim 6 wherein said third portion includes a vertical exhaust conduit and a bottom exhaust elbow.

10. The implement of claims 1, 2, or 3 wherein said intake means include an intake throat and at least one plant guide, said plant guide including a panel pivotally disposed on a vertical side of said intake throat and at least one adjustment means for adjusting the position of said plant guide relative to said intake means.

11. The implement of claim 10 wherein said intake throat further comprises a screen disposed at the exterior region of said intake throat.

12. The implement of claims 1, 2, or 3 wherein said exhaust means further comprises an exhaust throat, said exhaust throat including an outlet.

13. The implement of claim 12 wherein said exhaust throat is disposed directly opposite said intake throat.

14. The implement of claim 13 wherein said intake means include dispensing means, said dispensing means comprising a spray nozzle or an injector for the addition of pesticides, herbicides or other fluids into the airflow therethrough.

15. The implement of claim 14 wherein said inlet and said outlet are disposed opposite and facing one another whereby the injected fluid recirculates with the airflow.

16. The implement of claim 13 wherein said exhaust means include dispensing means, said dispensing means comprising a spray nozzle or an injector for the addition of pesticides, herbicides or other fluids into the air flow therefrom.

17. The implement of claim 16 wherein said dispensing means are disposed on said exhaust throat.

18. The implement of claim 16 wherein said inlet and said outlet are disposed opposite and facing one another whereby the injected fluid recirculates with the airflow.

19. An implement for the removal of insects or the like from plants, comprising:
   a fan housing disposed to be adjacent to a plant row; and
   an air flow means connected to said fan housing wherein said air flow means includes a conduit for transfer of air from one side of the plant row to a directly opposite side, said fan housing including a fan and an intake means, said intake means having an inlet, said inlet disposed to be immediately adjacent to said one side of plants in such plant row in order to take in an intake airflow thereover, said conduit being connected to said fan housing and extending away from said fan housing, said conduit traversing the plant row and discharging exhaust airflow on the plants at the side opposite said inlet; said conduit including first, second, and third portions and a discharge means, said first portion extending substantially upward and attached to said fan housing, said second portion attached to said first portion and extending substantially horizontally from said first portion for traversing said plants, said third portion attached to said second portion and extending substantially downward therefrom, said discharge means being attached to said third portion and having an outlet opening, said outlet opening being directed towards said inlet opening.

20. The implement of claim 19 wherein said intake means is axially aligned with the axis of rotation of said fan.

21. The implement of claim 19 wherein said fan is a centrifugal fan, said centrifugal fan having an axial intake and a peripheral exhaust.

22. The implement of claim 19 wherein said implement comprises at least two such discharge means whereby at least one fan housing, at least one exhaust means, and at least one discharge means are dedicated per plant row thereby permitting said implement to remove insects or the like from a plurality of plant rows simultaneously.

23. The implement of claim 19 wherein said first portion includes a transition piece and an interior exhaust elbow, said transition piece being disposed substantially peripheral and tangential to said fan.

24. The implement of claim 19 wherein said second portion includes a horizontal exhaust conduit and a top exhaust elbow.

25. The implement of claim 19 wherein said third portion includes a vertical exhaust conduit and a bottom exhaust elbow.

26. An implement for the removal of insects or the like from upstanding plants of multiple parallel crop rows, comprising:
   support means, and
   fan means including a plurality of fan units mounted on said support means for providing air flow through each of a plurality of crop rows and into a fan unit, each of said fan units including a fan housing and a fan in said housing which propels air through the respective housing at a substantial velocity, said fan units being disposed on said support means such that at least one of said fan units will be adjacent one side of each of said plurality of crop rows, at least one of said fan units so disposed adjacent each of said crop rows including an air intake means disposed to be between the respective fan and the respective adjacent crop row and opening to said one side of that adjacent crop row, said fan means including a fan exhaust air flow outlet disposed to be adjacent each of said crop rows on a side thereof opposite said one side and directed toward said intake means on said one side of the respective crop row for directing exhaust air flow through the respective crop row toward said respective intake means for collecting insects and the like from said crop rows into said fan units.

27. The implement of claim 26 and wherein the respective air intake means and exhaust air flow outlet are in horizontally spaced relation to one another to receive upright plants therebetween.

28. The implement of claim 26 wherein said fan exhaust air outlets are exhaust outlets of said fan units.

29. The implement of claim 26 and wherein each of said fan units comprises a fan housing having its exhaust in closed communication with said fan exhaust air outlet which is directed toward said intake means of that same fan unit thereby providing substantially closed-loop circulation of air from said air intake means through said fan unit and through the space between said exhaust air outlet and said air intake means.

30. The implement of claim 29 and including means for dispensing plant treatment material into said substantially closed-loop circulation.

31. The implement of claim 26 and including means for supporting said support means on a vehicle for propelling said implement through a field and thereby removing insects and the like from crop rows of standing plants as said plants pass through the spaces between the respective air intake means and exhaust air flow outlet.

32. The implement of claim 26, 27, 28, 29 or 31 and including means associated with each of said exhaust air slow outlets for dispensing plant treatment materials into the air flowing out of each respective exhaust air flow outlet.

33. The implement of claim 32 wherein said dispensing means comprises a spray nozzle or injector.

34. The implement of claim 26 and wherein each of said exhaust air flow outlets and the respective intake means are in axial alignment with one another.

35. The implement of claim 26, 34, 27, 28, 30 or 31 wherein said opening of each of said air intake means is of an elongated configuration having its major dimension vertical and its minor dimension horizontal and of a size to span a substantial vertical portion of said plants.

36. The implement of claim 35 wherein each of said exhaust air flow outlets is of an elongated configuration having its major dimension vertical and its minor dimension horizontal and of a size to span a substantial vertical portion of said plants.

37. The implement of claim 35 wherein said fan means is of a capacity to provide external air velocities of approximately 100 feed per second adjacent to said air intake.

* * * * *

UNITED STATES PATENT AND TRADEMARK OFFICE
CERTIFICATE OF CORRECTION

PATENT NO. : 5,214,876
DATED : June 1, 1993
INVENTOR(S) : Eugene G. Sukup

It is certified that error appears in the above-indentified patent and that said Letters Patent is hereby corrected as shown below:

Column 6, line 38, after "such" delete ",".

Column 7, line 63, claim 22, after "two such" insert -- fan housings, at least two such exhaust means, and at least two such --.

Column 8, line 62, claim 32, "26, 27, 28, 29, or 31" should read -- 26, 27, 28, 29, 31, or 34 --.

Column 8, line 64, "slow" should read -- flow --.

Signed and Sealed this

Nineteenth Day of April, 1994

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,214,876

DATED : June 1, 1993

INVENTOR(S) : Eugene G. Sukup

It is certified that error appears in the above-identified patent and that said Letters Patent is hereby corrected as shown below:

Column 9, line 5, claime 35, "26, 34, 27, 28, 30, or 31" should read -- 26, 34, 27, 28, 29, 30, or 31--.

Signed and Sealed this

Seventh Day of June, 1994

Attest:

BRUCE LEHMAN

*Attesting Officer*     *Commissioner of Patents and Trademarks*